United States Patent
Muramatsu et al.

(10) Patent No.: US 8,184,860 B2
(45) Date of Patent: May 22, 2012

(54) IMAGE PROCESSING DEVICE FOR CONTROLLING A PLURALITY OF TASKS

(75) Inventors: Shoji Muramatsu, Ibaraki (JP);
Tstsuaki Nakamikawa, Ibaraki (JP);
Takeshi Shima, Ibaraki (JP); Yuji Otsuka, Ibaraki (JP); Mirai Higuchi, Ibaraki (JP); Tatsuhiko Monji, Ibaraki (JP); Kota Irie, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 1021 days.

(21) Appl. No.: 11/780,995

(22) Filed: Jul. 20, 2007

(65) Prior Publication Data
US 2008/0025597 A1 Jan. 31, 2008

(30) Foreign Application Priority Data
Jul. 21, 2006 (JP) ................................. 2006-198876

(51) Int. Cl.
*G06K 9/00* (2006.01)

(52) U.S. Cl. ....................................... 382/104; 382/103

(58) Field of Classification Search .................. 382/104, 382/103; 358/3.28, 445
See application file for complete search history.

(56) References Cited

U.S. PATENT DOCUMENTS
6,498,598 B2 * 12/2002 Watanabe ..................... 345/156
2006/0114514 A1 6/2006 Rothschild FOREIGN PATENT DOCUMENTS
EP 1 646 240 A1 4/2006
JP 6-67899 A 3/1994
JP 2000-299841 A 10/2000

OTHER PUBLICATIONS
European Search Report dated Feb. 19, 2009 (Six (6) pages).

* cited by examiner

*Primary Examiner* — Claire X Wang
(74) *Attorney, Agent, or Firm* — Crowell & Moring LLP

(57) ABSTRACT

An image processing device of the present invention performs a task to execute an image processing This image processing device comprises a picture frame assigning unit that assigns an identification number to the image data to be collected by a picture collection device, an image capture requested picture of checking unit that checks whether the image data to which the identification number is assigned is identical with the image data that is requested by the task, an requested picture frame image collection notification unit that notifies the task of the image data having been collected which the task requests, if the image data to which the picture frame number is assigned is identical with the image data which the task requests, and an image capture requested picture frame receiving unit receives an image collection request from the task.

4 Claims, 10 Drawing Sheets

FIG.2

| PICTURE PROCESSING FUNCTION | TASK ID | MODE | VALIDITY FLAG | PRIORITY RANKING | PICTURE QUALITY | PROCESSING INTERVAL | CAMERA PICTURE |
|---|---|---|---|---|---|---|---|
| MONITORING | 8'00010000 | (1) | ON | 100 | — | SHORT | FOR MONITORING |
| DRIVE RECORDER | 8'00000001 | (1) | ON | 127 | — | LONG | FOR MONITORING |
| PICTURE ALBUM OF HIGH QUALITY | 8'00000100 | (2) | ON | 200 | HIGH | SHORT | FOR MONITORING |
| PICTURE ALBUM OF LOW QUALITY | … | … | … | … | LOW | LONG | FOR MONITORING |
| AUTOMATIC LIGHT CONTROL | … | … | … | … | — | LONG | FOR IMAGE DISCRIMINATION |
| LANE DEPARTURE WARNING | 8'00000010 | (3) | ON | 132 | — | MEDIUM | FOR IMAGE DISCRIMINATION |
| CUT-IN VEHICLE WARNING | 8'00001000 | (3) | ON | 146 | — | MEDIUM | FOR IMAGE DISCRIMINATION |
| OVERTAKING VEHICLE WARNING | … | … | … | … | — | MEDIUM | FOR IMAGE DISCRIMINATION |
| PARKING ASSISTANCE | 8'00000010 | (1) | OFF | 163 | — | LONG | FOR IMAGE DISCRIMINATION |
| IN-LANE DRIVING ASSISTANCE | … | … | … | … | — | MEDIUM | FOR IMAGE DISCRIMINATION |
| COLLISION IMPACT REDUCTION | … | … | … | … | — | SHORT | FOR IMAGE DISCRIMINATION |
| COLLISION PREVENTION | … | … | … | … | — | SHORT | FOR IMAGE DISCRIMINATION |
|  |  |  |  |  |  |  |  |

(—:NO SPECIFICATION)

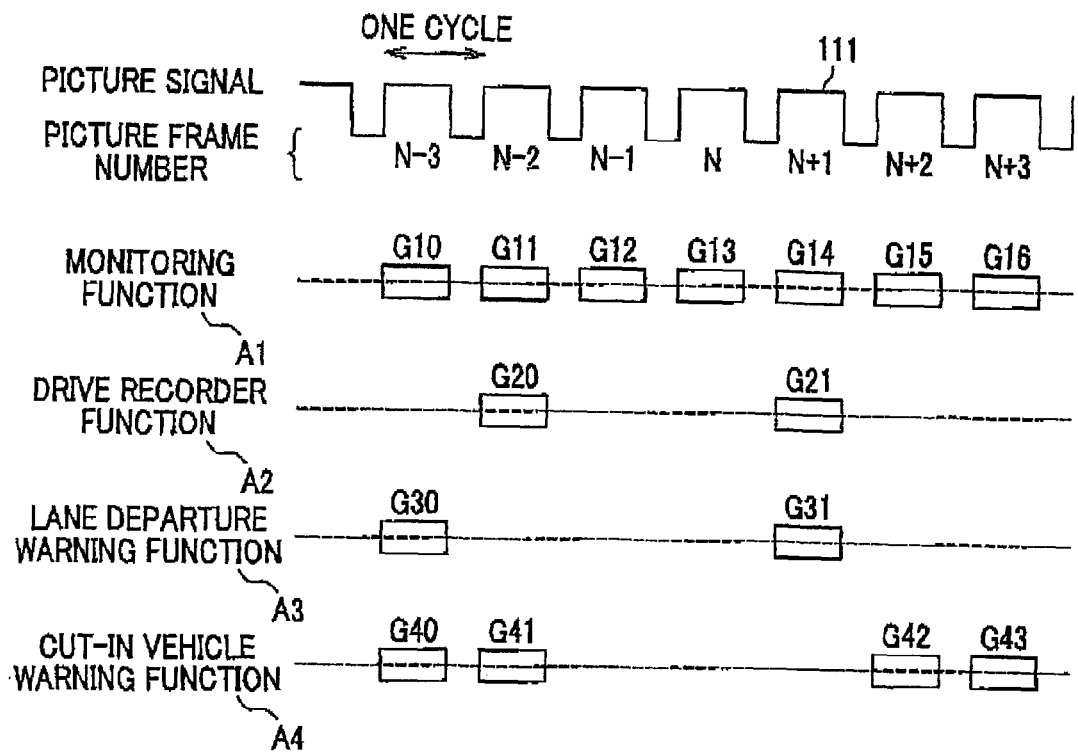
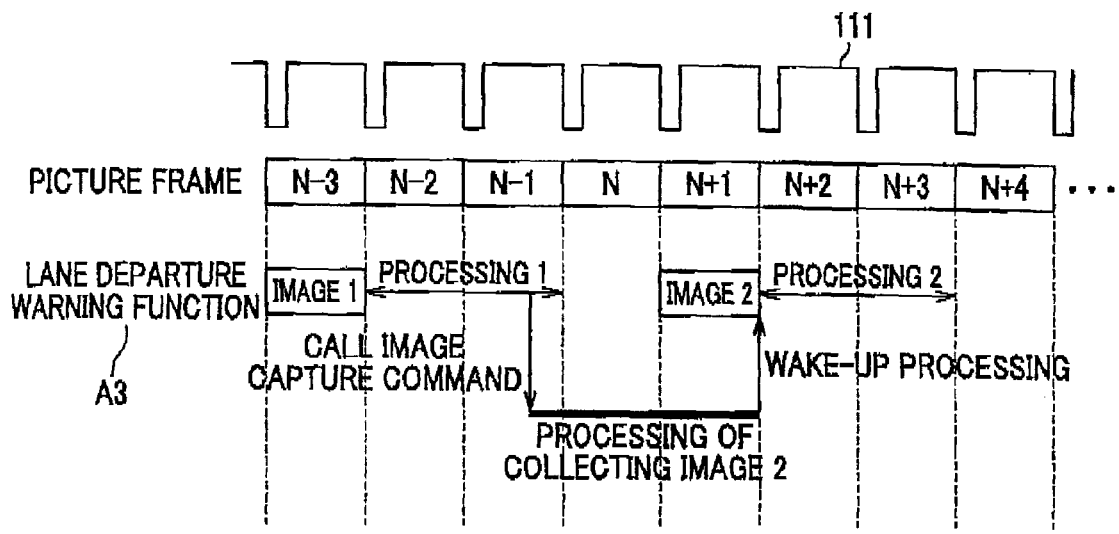

FIG.6
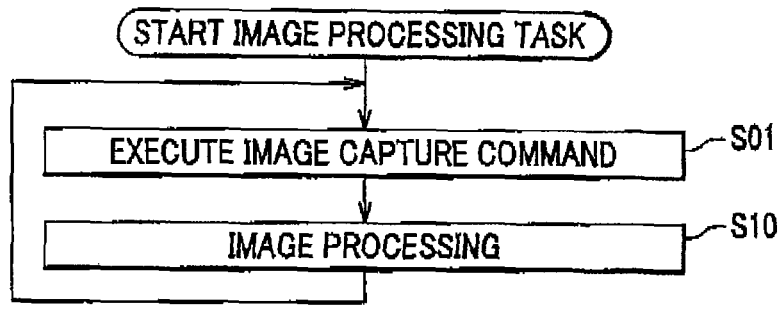
FIG.7
| VALIDITY FLAG | TASK ASSOCIATED ID | IMAGE CAPTURE REQUESTED PICTURE FRAME NUMBER | T01 |
|---|---|---|---|
| ON | 8'00010000 | N | |
| ON | 8'00010001 | N+1 | |
| OFF | 8'00000010 | N+4 | |
| ON | 8'00000100 | N+1000 | |
| | | | |
FIG.8
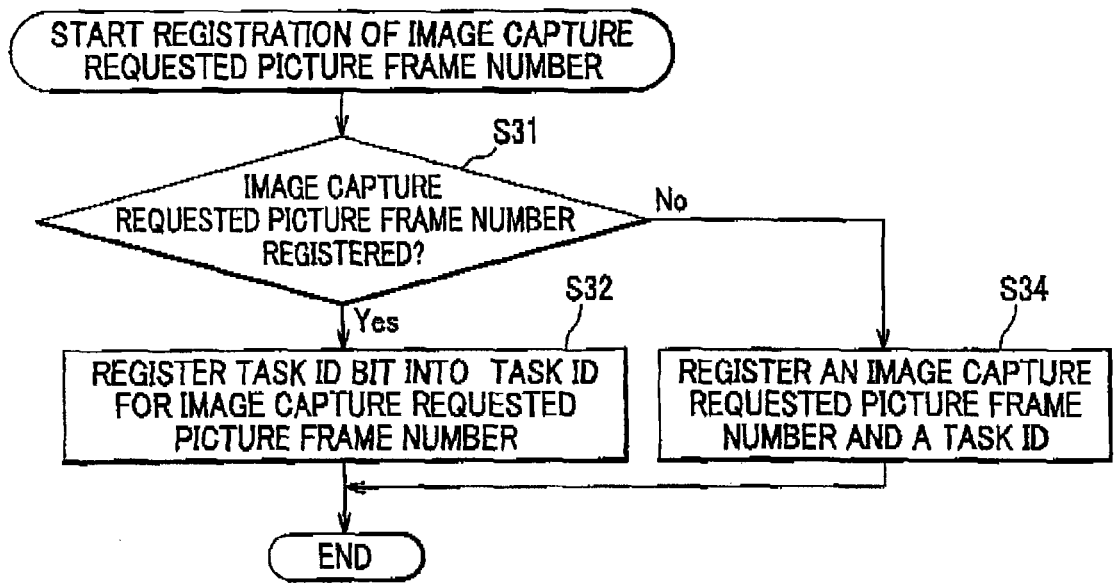

| VALIDITY FLAG | TASK ASSOCIATED ID | IMAGE CAPTURE REQUESTED PICTURE FRAME NUMBER | SHUTTER SPEED | GAIN | IMAGE ANGLE |
|---|---|---|---|---|---|
| ON | 8'00010000 | N | 1/1000 | 100% | 30° |
| ON | 8'00010001 | N+1 | 1/1000 | 100% | 30° |
| OFF | 8'00000010 | N+4 | 1/200 | 200% | 45° |
| ON | 8'00000100 | N+1000 | 1/1000 | 100% | 30° |
| | | | | | |

IMAGE PROCESSING DEVICE FOR CONTROLLING A PLURALITY OF TASKS

CROSS REFERENCE TO RELATED APPLICATION

This application claims the foreign priority benefit under Title 35, United States Code, §119(a)-(c), of Japanese Patent Application No. 2006-198876, filed on Jul. 21, 2006 with the Japanese Patent Office, the disclosure of which is herein incorporated by reference in its entirety.

BACKGROUND OF THE INVENTION

This invention relates to a image processing device to implement a plurality of image processing functions simultaneously, especially relates to task scheduling of the plurality of image processing functions.

As both computer technology and picture technology have been drastically developed in recent years, it has become import to realize an image processing device to implement a plurality of image processing functions simultaneously. For instance, one image processing device with a camera which is installed on a automobile vehicle is requested to be capable of both discriminating a road lane and detecting an obstacle on the mad lane. When a computer implements a plurality of image processing function alone, it divides the image processing functions into a plurality of small processing functions each of which is called task and performs the tasks. In this case it is indispensable for the computer to manage every task involved without failure. In most cases of the image processing, the tasks are controlled in synchronization with the timing of the picture input. In the case of the image processing device installed on an automobile vehicle, the image processing is performed while pictures are being collected and the image processing function needs to be performed as soon as the image data to be processed is ready for processing after the image data is collected. In such an image processing system as explained above the image processing explained as above the interval for storing pictures is used for the interval for the task scheduling.

According to Japanese Laid-open Patent Application No. 06-67899, a frame to determine an interval for each task to start and the task scheduling is defined, the computer processing is performed in a frame defined on the task scheduling. To be specific, the frame for each computer function to be performed is controlled based on the task scheduling table consisting of frames whose interval is constant. If this method is applied to the image processing device, frames are defined by an interval at which synchronizing signals of pictures are given.

Japanese Laid-open Patent Application No. 2000-299841 discloses a method to identify picture data to be processed and define the timing for processing making use of picture synchronizing signal. In this method the scheduling is done for determining in which frame each video data is transmitted.

SUMMARY OF THE INVENTION

An image processing device to detect an environment around a running vehicle has to implement image processing functions in accordance with vehicle's running velocity and the movement of an object to be measured. For instance, when the vehicle is running at a high speed, the processing interval has to be made so short that a driver in the vehicle does not lose sight of the object to be measured. When an image processing function used for a safe system is implemented, a processing needs to be performed reiteratively for a short period to enhance reliability of the resultant image to be obtained depending on the circumstance. In such a case it is necessary to alter the schedule for each task to be performed as often as the task alteration and the circumstance require. On the other hand, if the task scheduling control method, which is disclosed in Japanese Laid-open Patent Application No. 06-67899 and Japanese Laid-open Patent Application No. 2000-299841, it is difficult to alter a task because all the tasks registered in the task scheduling table have to be taken into account. For instance, supposing that the timing for a certain function to be performed is to be altered, this alteration has to be made after checking every function on its performance status, that is, how it is being performed. However since it is difficult to check every function on its performance status, altering the task is not easy. Moreover it is necessary to take it into account that a task scheduling table has to be made based on a task that is performed at the longest interval. Accordingly if a task can be scheduled to be performed at a longer interval, other tasks have to be scheduled to be performed based on the longest task interval and it is rather complicated to control and alter the task scheduling table. As mentioned above, there is a problem that altering the task scheduling can not be done when a function is exchanged or a task performance interval is altered unless every function is checked on its performance status.

The objective of the present invention is to facilitate control over tasks to realize each function. In other words, the objective of the present invention is to facilitate altering the performance interval of each task when it needs to be altered to adjust to a new circumstance deleting a currently implemented function and adding a new function.

The image processing device according to the present invention comprises an picture frame assigning unit for adding an picture frame number to each collected picture, an image capture requested picture frame checking unit that checks whether the collected picture is to be used in the image processing function part, a requested picture frame image collection notification unit for noting the image processing task of a picture being collected when the collected picture is to be used in the image processing part and an image capture requested picture frame receiving unit for receiving a processing task and an image data of a picture frame both of which are necessary for realizing the image processing function. The image processing device is characterize in that an image data requested by the image processing function is assigned to each picture frame.

According to the present invention, the task management of the image processing functions is easily performed while a plurality of image processing fixations are working. To be specific, changing the processing interval of each task and adding and deleting functions in accordance with the change in the peripheral circumstance, which is an object image processing functions deal with, are easily executed. Moreover each task is independently controlled with this invention and it is possible to download dynamically a program, upgrade each function program independently while the execution program varies depending on the function and alter an operation to change a function.

BRIEF DESCRIPTION OF THE DRAWINGS

The object and features of the present invention will become more readily apparent from the following detailed description taken in conjunction with the accompanying drawings in which:

FIG. 2 is a figure showing a task control table.

FIG. 3 is a time chart explaining the processing timing of the image collection processing.

FIG. 4 is a time chart explaining the timings of the image collection processing and the image processing.

FIG. 6 is a flow chart of image processing in a task.

FIG. 7 is a figure showing a table of information on image capture picture frames FIG. 8 is a flow chart explaining registration processing of image capture picture frame numbers.

The same or corresponding elements or parts are designated with like references throughout the drawings.

DETAILED DESCRIPTION OF THE INVENTION

Figure 1:
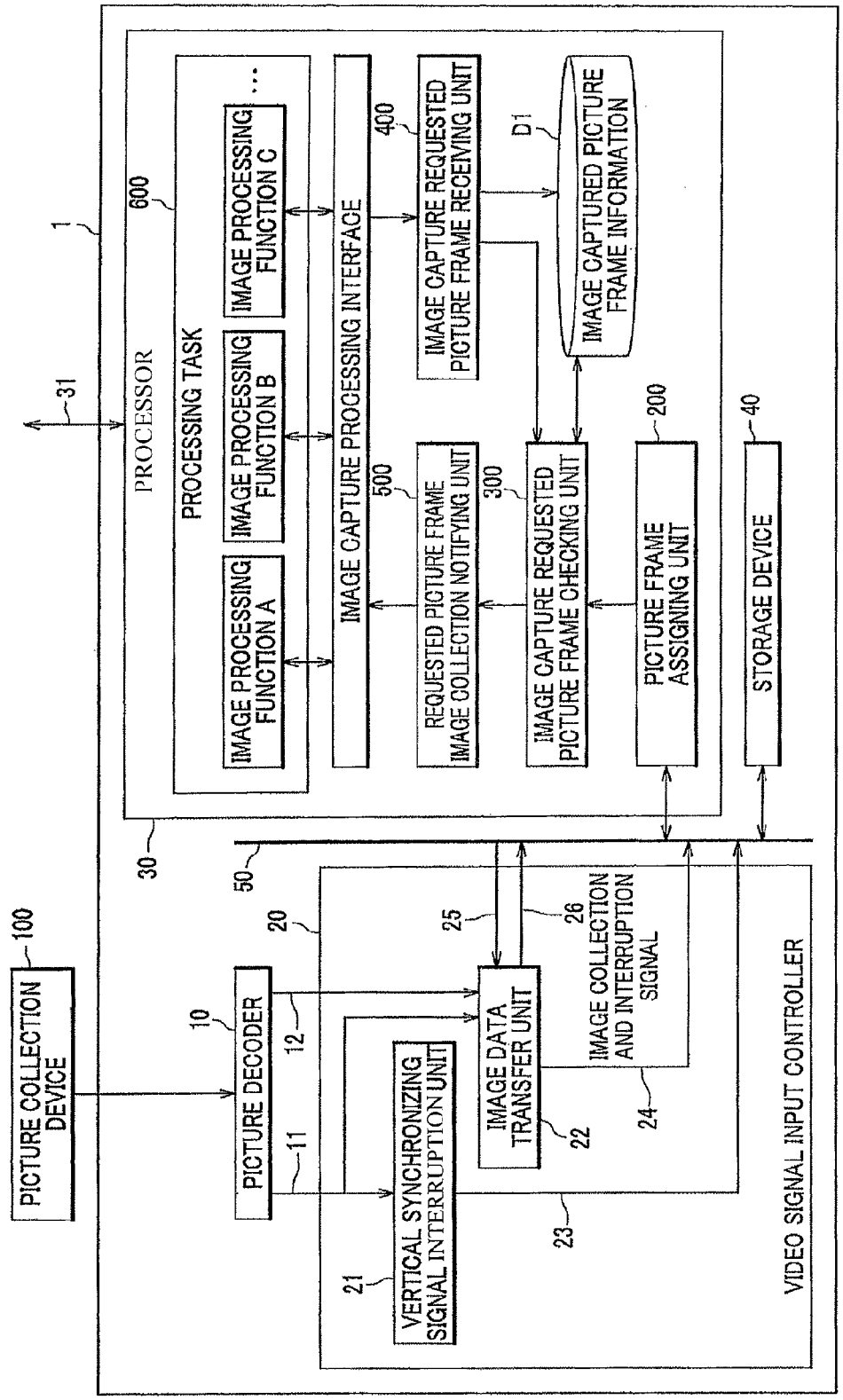
FIG. 1 is a figure schematically explaining the configuration of the present invention.

Looking to the figures attached, the embodiments of the present invention is explained in detail. To begin with, an explanation is given on the configuration of an embodiment of the present invention. The image processing device 1 includes a video decoder 10, a video signal input unit 20, a processor 30 and a storage device 40. From a picture collection part 100 that consists of such devices as a video camera, an image pick-up device and a hard disk recorder, picture data 110 are input to the video decoder 10. The video signal 110 that is input are divided through the video decoder 10 into synchronizing signals 11 and image data 12. If the video signal contains analog information, the video decoder 10 is an equivalent to a device called video-reorder and capable of performing both analog-digital transformation and separation of synchronizing signals. Both the vertical synchronizing signal 11 and the picture signal 12 are transmitted to the video signal input controller 20. The video signal input controller 20 checks whether the picture signal 12 are to be used for a flyer processing or not and if the video signal input controller 20 determines that the picture signal 12 is to be used for a further processing, the video signal input controller 20 transmits the picture signal 12 to the storage device 40 to be stored. The video signal input controller 20 is physically connected with the processor 30 and the storage device 40 trough bus line 50 and usually bus connected with them. The stored image data in the storage device are processed by the processor 30. Results after the processing are sent to an outside controller or an outside system.

Figure 10:
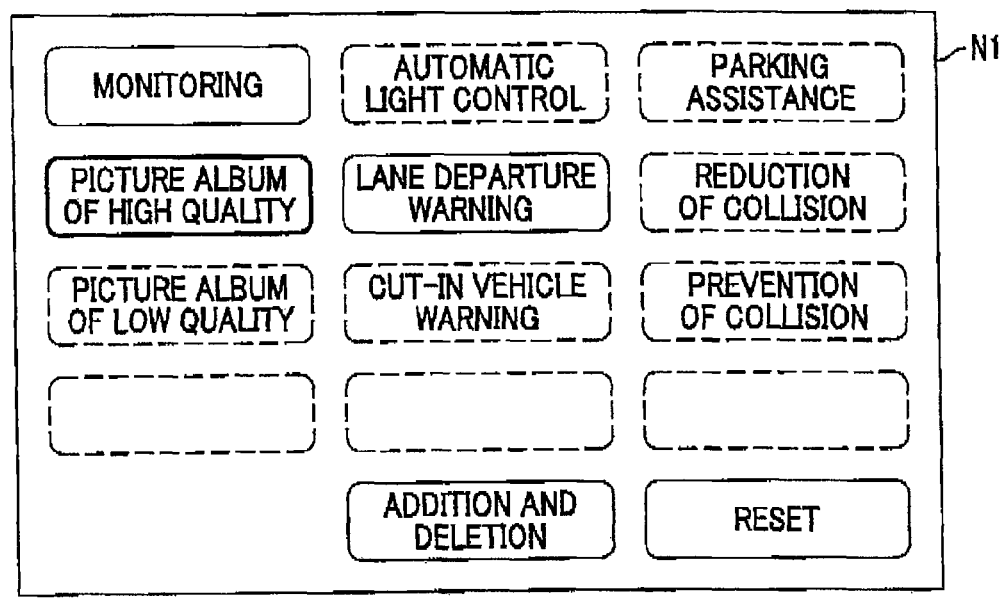
FIG. 10 is a figure schematically explaining a user interface in which tasks are registered.

Looking at FIG. 10, an explanation is given on the software configuration of the present embodiment. Since this embodiment assumes that the present invention is applied to an image processing device for the automobile, such image processing functions as support for driving an automobile and entertainment applications are realized with this embodiment. The software is to be performed by the processor 30 indicated in FIG. 1. Image processing functions such as a monitoring function A1, a drive recorder function A2, a lane departure warning function A3 and a cut-in vehicle warning function A4 are performed as tasks. Each operation program works on an operation system which is capable of managing and dealing with a plurality of tasks. There are other main programs than application programs to be processed by the processor 30, such as an initialization function P1 to initialize the system, an image processing task management function P2 to choose an image processing to start up and perform an image processing function to work, a user interface function P3 to control a function of providing information for a driver and other functions, a communication function P4 to give instructions of outside devices according to the result of each image processing function and an image collection function P5 to collect images on request from each image processing function. Each image processing function needs image data for its processing and has capture of the image data executed by calling the image capture command of the image collection function P5. FIG. 2 shows an example of a task management table in which are registered programs possible to be performed by the image processing task management function P2.

Each image processing function to be processed by the image processing device 1 already explained in FIG. 1 is specified with such specifications as high or low quality of an image to be processed or a processing interval, as tabled in the task management table in FIG. 2. For instance, the processing interval may be made long if the corresponding image processing allows for a slow response speed while the processing interval has to be ma short if the corresponding image processing needs a quick response speed. The basic processing intervals are presumed as listed in FIG. 2. However the following may happen. If the circumstance changes, the processing interval which is "medium" has to be abruptly changed to "small". For instance when a vehicle increases its speed it can not follow the driving environment and the processing interval has to be made "small". For another instance, when a distance to a preceding vehicle or an on-coming vehicle becomes small, a driver has to be warned of the danger sooner by making the processing interval "small". Changing the processing interval can be performed easily if there is only one image processing function. However if a number of image processing functions are to be performed by one hardware device. Changing the processing interval can not be performed easily because such factors as the timing at which images am collected and processing capacity to perform each image processing function.

Moreover in order to realize each image processing function, such factors relating to image quality as alteration of shutter speed and gain adjustment have to be controlled. However just by facilitating the explanation of the embodiments, it is assumed hereinafter that only one kind of the image is used by a plurality of the image processing functions.

Looking to FIG. 3, an explanation is given about how a plurality of image processing functions are performed in an image processing device. In FIG. 3 the picture signal means a vertical synchronizing signal 111. One cycle of the vertical synchronizing signal (from a low in the signal to the following low) constitutes a frame. Each number written under the picture frame is a picture frame number to be used for the task management. FIG. 3 explain how a plurality of image processing functions, such as the monitoring function A1, the drive recorder function A2 the lane departure warning function A3 and the cut-in vehicle warning function A4, are simultaneously working. The rectangles G10 to G43 on the broken lines for the image processing functions indicate image data to be used for the image processing. That is, it is shown that each image processing function performs a processing on the image data for a picture frame corresponding to a rectangle indicated. In the case of the monitoring function A1 all image data of G10 to G16 are stored and an image data is captured for every frame. As far as the drive reorder function A2 is concerned, it does not need to process an image data for every frame and process an image data every 3 frames. Therefore the image data G20, G21 are captured and processed. As for the lane departure warning function A3, an image data is captured every 4 frames and the image data G30, G31 are processed. As for the cut-in vehicle warning function A4, a couple of image data for two frames in a row have to be processed. Therefore after a couple of the image data G40, G41 for two frames in a row are processed, another couple of the image data G42, G43 for another two frames, which are 5 frames corresponding to the processing interval ahead of the former image processed frames, are captured and processed.

In the case the prior art, a consolidated control system is adopted, in which there exists in advance a task to perform the task scheduling management on the basis of a certain processing interval for each image processing function and this task controls over the status of every image processing function. In this case it is extremely difficult to assign a priority ranking to each image processing function with the increasing number of image processing functions to be controlled. The present invention is intended to provide a measure to work out this problem and how it is worked out is explained by showing how individual image processing functions are implemented.

Taking the lane departure function A3 as an example of the image processing function, the outline of the processing flow is explained referring to FIG. 4. The lane departure warning function A3 according to the present embodiment is implemented using image data captured every 4 picture frames. Firstly "IMAGE 1" as an image data for the picture frame numbered N−3 is collected and stored in W40. Secondly "PROCESSING 1" to detect the lane and warn is performed after "IMAGE 1" is stored in a processing task to implement the lane departure warning function A3. "IMAGE 2" is also collected in "PROCESSING 1". In the image collection process a picture frame number of which an image data to be needed next is captured is decided according the velocity of a driver's vehicle, a type of a lane on which the driver's vehicle is running and the circumstance of other vehicle running near the driver's vehicle, and a necessary procedure to capture the image data is taken. This procedure to collect the image data is taken using tee following image capture command.

CaptureImage(Image Control Number,Picture Frame Number)            (Formula 1)

In this command "Image Control Number" is a number for the image processing function to refer to information needed to perform a captured image data for a picture frame. For instance. For this "Image Control Number" is used such numbers as a top pointer of a sequence in which image data are stored or a number defined to access to a management table. The procedure of capturing the image data of "IMAGE 2" is executed in "PROCESSING 1" by assigning a number of a picture frame needed for the following image processing with this command. In FIG. 4 "IMAGE 2" is to be processed in the following image processing and its data is to be captured from the picture frame numbered N+1. Therefore the following command is executed.

CaptureImage(#(IMGE2),N+1)            (Formula 2)

Figure 5A:
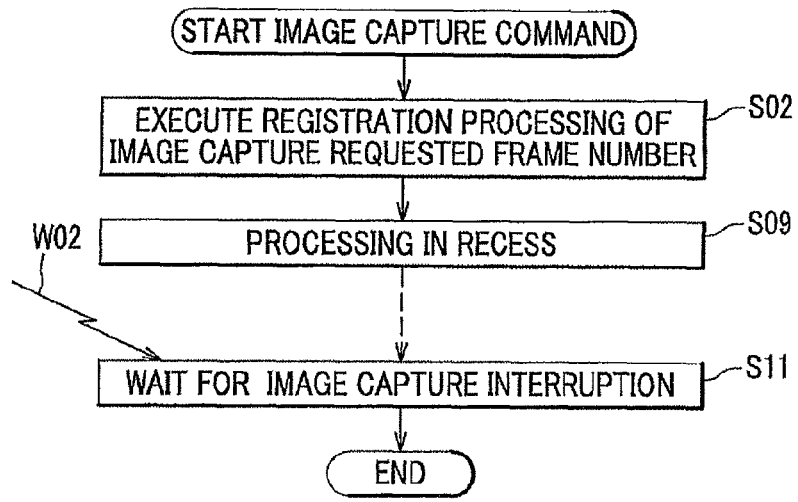
FIG. 5A and FIG. 5B explain a flow chart of implementing the image capture command and the vertical synchronizing signal interruption processing.

In this command #(IMGE 2) stands for a number in the management table to refer to the image data to be captured for "IMAGE 2". Executing this command, the tasks in the lane departure warning function A3 are able to capture an image data for the picture frame numbered N+1 as "IMAGE 2". The processing in executing this command is explained, referring to FIG. 1, FIG. 5 and FIG. 6.

The video signal output by the picture collection device 100 is transmitted to the video decoder 10 and this video signal 110 is divided into a synchronizing signal 11 and an image data 12, both of which are transmitted to the video signal input controller 20. The video signal input controller 20 is equipped with a processor 30 and an image data transfer unit 22. The vertical synchronizing signal interruption unit 21 is meant to generate a vertical synchronizing signal interruption signal on receiving a vertical synchronizing signal 11 and the image data transfer unit is to selecting necessary data and transmit them to the storage device. Image data to be used for the image processing are selected by the image data transfer unit 22 and this selected image data transfer unit 22 are transmitted through the bus line 50 to the storage device and stored therein. Moreover the image data transfer unit 22 outputs an image collection end interruption signal 26 as soon as finishing transmission of necessary data.

In this processing starting up the image processing is controlled by software. To be specific, a register which is shared by the vertical synchronizing signal interruption unit 21 and the image data transfer unit 22 and controls the image collection is set to a mode in which the register is to give an order to execute the image collection and the image capture command indicated in FIG. 5 is executed.

In FIG. 5 is shown the flow chart explaining the processing from executing the image capture command to executing the image processing function. As is indicated in the software configuration figure of FIG. 16, each image processing function is stared up by the image processing task management function P2 and capturing image data needed for the image processing is possible by executing the image capture command (CaptureImage). Programs and necessary information to execute the flow indicated in FIG. 5 are processed and controlled by the image collection function P5. This processing is explained in detail as follows.

To begin with, the image capture command indicated in Formula 1 is invoked by the image processing function, in order to capture image data needed for the image processing (S01). Wile executing the image capture command is under way, a picture frame number of the captured image data is registered in a table of the image captured frame information D1 (S02). An explanation is given later on this table using FIG. 7. After information on the picture frame number of the captured image data are registered, the processing of executing the image capture command becomes in recess (S09) and is kept in a state of waiting for an image to be captured. Then the processing of executing the image capture after a registered image data is collected and a wake-up processing is executed by notification by the vertical synchronizing signal interruption processing, which is explained later, and the image processing function is continues its processing.

Figure 5B:
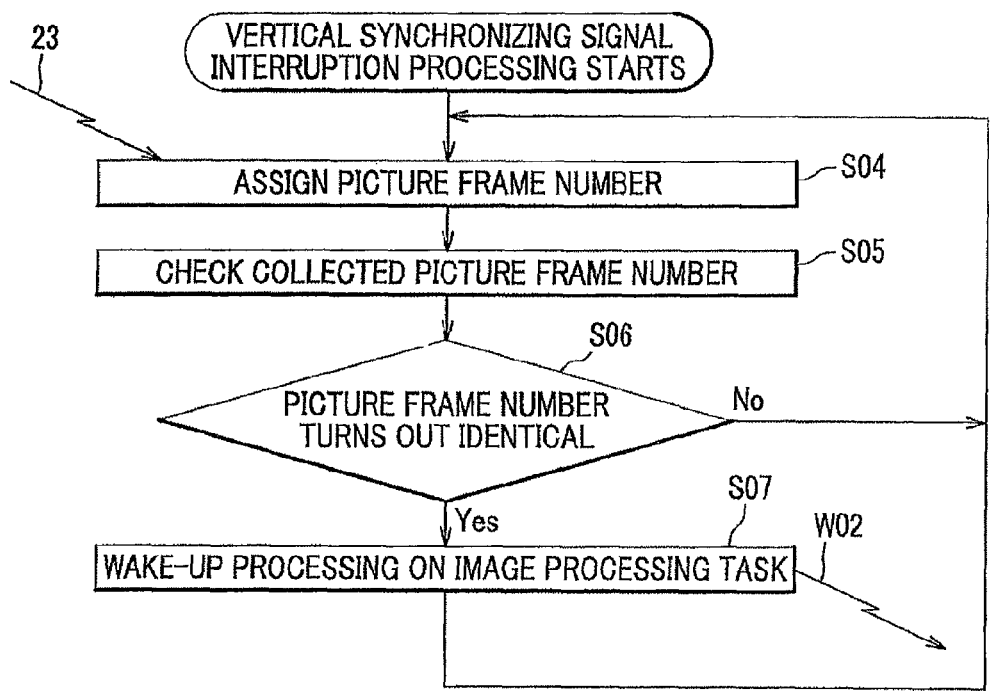

While picture data are being transmitted from the picture collection device 100, the vertical synchronizing signal interruption unit 21 generates regularly a vertical synchronizing signal interruption signal 23. As soon as this vertical synchronizing signal interruption signal 23 is transmitted, the vertical synchronizing signal interruption processing indicated in FIG. 5B is executed. Firstly when the vertical synchronizing signal interruption occurs and the processing goes into the interruption routine, the picture frame assigning unit 200 assigns a picture frame number to an image data that has been transmitted to the storage device (S04). This picture frame number is what is indicated in FIG. 3 as a picture frame number and a consecutive number are given to an image data every time an image data is input.

In this embodiment of the present invention, whenever any image processing function that needs capturing an image data starts execution, a picture frame number is assigned to every input image data while the image processing is under way. Secondly verification of the picture frame number assigned to the input image data is performed by the image request picture frame checking unit 300 if it is identical with the picture frame number assigned by the image capture command, of which an image data is requested to be captured (S05). As a result of the determination based on this checking (S06), if it turns out that the picture frame number given to an image data that has been collected is identical with any picture number of which an image data is requested to be captured, the w500 is to send the notification W02 to a task that has requested the image data of the picture frame number to be captured (S07). This notification is to be executed through the wake-up processing that makes a task of the image processing function in that state of being executed, using a system call or other means. On the other hand, if it tuns out that the picture frame number assigned to an image data that has been collected is not identical with any picture frame number of which an image data is requested to be captured, the vertical synchronizing signal interruption processing becomes in recess without the wake-up processing being executed and the processing of executing the image capture command is kept waiting for this vertical synchronizing signal interruption signal 23 to be generated.

In FIG. 6 is shown a flow chart of a task to execute the image processing function. Once the image processing function starts up a task by initialization and/or other processing, the image capture command is to be executed (S01) and the image processing function is usually in recess until an image data is collected, which an image data is requested to be captured at the beginning of execution of the image capture command. As soon as the requested image data is collected, the wake-up processing is executed and the image processing function comes back into a state of being executed. Then the image processing (S10) is executed. As shown in the flow chart in FIG. 5A, when an image capture command is executed, the image processing function is kept in a state of waiting for image capture interruption S11 to wait for an image data of the desired picture frame number to be input. As soon as an image dam to be used for the image processing is input, the wake-up processing is executed, which leads to a task for the image processing function waking up, and the image processing is executed. Then the image capture command is executed again. Thus this iterative processing is executed.

So far, the embodiment of the present invention is explained on a case where only one image processing function is involved. Next the embodiment of the present invention is explained on a case where a plurality of image processing functions are involved. With respect to the image capture processing and the vertical synchronizing signal interruption processing which have been explained referring to FIG. 5A and FIG. 5B, processing for a plurality of image processing functions, which are not synchronous to each other, have to be executed.

Figure 16:
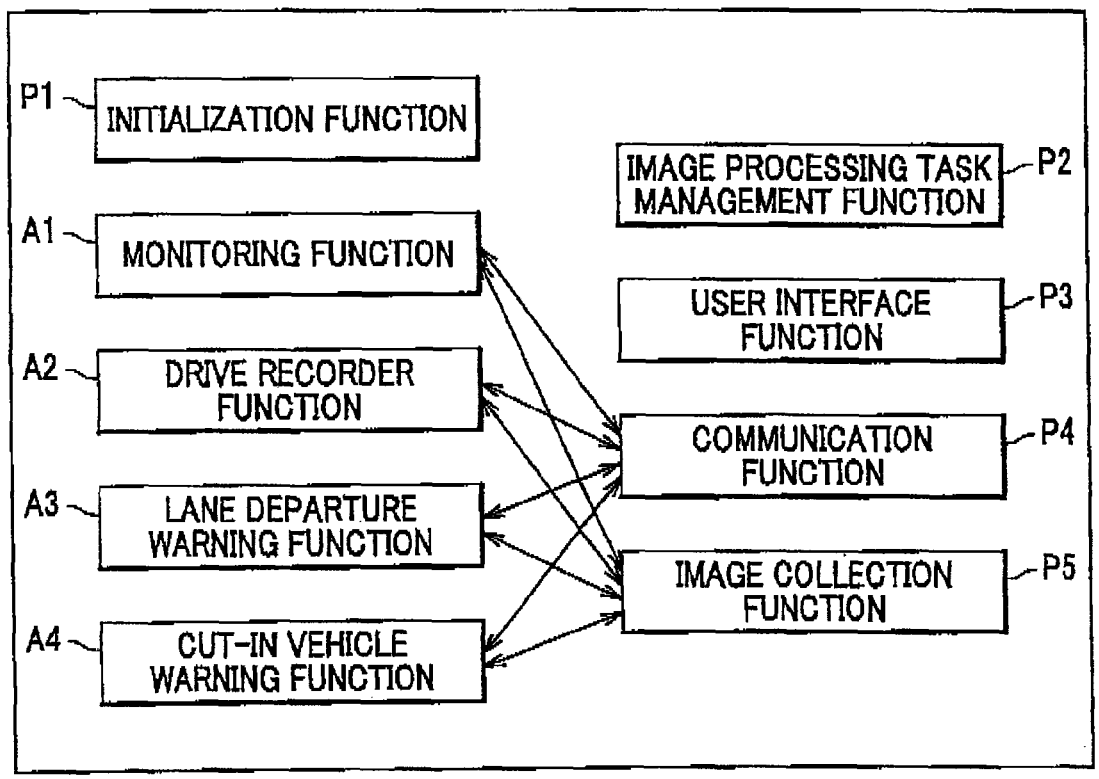
FIG. 16 is a figure explaining the task configuration of the image processing device according to the present invention.

Therefore in the present embodiment are executed a task to realize the image processing functions A1 to A4 (to be referred to hereinafter as an image processing function task) which are indicated in FIG. 16 and a task to realize the image collection function P5 (to be referred to hereinafter as an image collection task) which are indicated in FIG. 16. The image collection task is to receive a picture frame number for which an image data is needed by each image processing function, manage each picture frame number as collected picture frame information D1 stored in a database and execute a wake-up processing on a corresponding image processing function task that has requested the image capture as soon as an image data of the desired picture frame numbered is collected. The processing flow with respect to the image captured picture frame information D1 and its table content are explained.

To begin with, the detail table on the image captured picture frame information D1 is explained. This embodiment assumes that an identical image quality is required for every image processing function task. In other words al the parameters like shutter speed, gain and white balance that determines the picture quality of the collected pictures are identical with every processing involved. In FIG. 7 is shown the table configuration of the image captured picture frame information D1. The table D1 is composed of sequences and each sequence consists of the elements of a validity flag to show whether information registered in this table is valid or invalid, a task associated ID that is associated with image processing function tasks for which a captured picture frame number assigned through an image capture command is registered and a picture frame number assigned trough an image capture command. In each task associated ID a bit that is associated with an image processing function task that is executing an image capture command is set to 1. Accordingly if any bit of a task associated ID is set to 1, it follows that the image processing function task associated with the bit is to be woke up.

Referring to FIG. 8, an explanation is given on the processing flow of a registration processing of the image capture required picture frame number S02 that registers a picture frame number to be obtained for the table T01. When an image capture command is executed, all the image capture requested picture frame numbers, which are registered in the table T01, are searched and it is determined whether the image capture requested picture frame number has already been requested to be captured by other image processing function tasks (S31). If the picture frame number that is requested by the image capture command turns out to be identical to any of the registered picture frame numbers, a bit included in the ID that corresponds to the image processing function task is set to 1. As a result as soon as the image data of the corresponding picture flame is collected, the image processing function task is to be woke up (S32). If the picture frame number that is requested by the image capture command turns out to be identical to any of the picture frame numbers that are not registered, new information is added to register the picture frame number for which an image data is requested to be captured as well as an ID and a bit of the ID that corresponds to the image processing task is set to 1 (S34). Since this embodiment is capable of dealing with a plurality of image capture requests from image processing functions, a picture frame number requested by a plurality of image processing functions is registered in a table of the image capture requested frame information D1. As a result, it is possible to execute a wake-up processing of each image processing function task through the vertical synchronizing signal interruption processing.

According to file embodiment explained above, each task to execute an image processing function is capable of independently controlling its image capture timing and there is no need to perform the task scheduling in advance after checking the statuses of all the image processing functions. In this embodiment, if an image processing function changes its schedule of executing tasks are altered, for instance, due to change in driver's vehicle velocity, there is no influence exerted on the other asks. Moreover if an image processing function is added or deleted, it is easy to add and delete an image processing function because the task scheduling is performed independently on each image processing function.

In the embodiment so far explained is executed the image capture command expressed in Formula 1, in which a image control number and a picture frame number are assigned. However it is possible to adopt an image capture command in which a variable is assigned to a mathematical formula and assign picture frame numbers with this mathematical formula instead of assigning directly a picture frame number. This image capture command is indicated as follows.

$$\text{CaptureImage(image control number, picture frame number formula)} \quad \text{(Formula 3)}$$

In this command the picture Same number formula is not a unique number but a mathematical formula, a numerical sequence formula or an even/odd number and others. It is possible to assign a numerical sequence formula and have an image data captured, of which a picture frame number meets the numerical sequence formula. For instance, assigning a linear expression formula, $a \times n + b$, where n is an integer and both coefficients a and b are input. If a picture frame number of an image data meets the numerical sequence formula, then the image data is to be collected. It is also possible to use a mathematical formula inclusive of an inequality sign and assign a picture frame number based on this type of a mathematical formula. For instance, if a picture frame number is equal to or larger than m, then the image data is captured.

According to the embodiment explained so far, it is assumed that a plurality of image processing functions use images of an identical quality. That is the embodiment is explained based on images from pictures taken with identical camera control parameters. However, there are image processing functions for which images of different qualities are required to be created, which different qualities varies in such camera control parameters as shutter speed of an imaging device, a gain of an analog/digital transformer and an image angle. In other words, when images to be processed are captured, it is valid to assign other required information for camera control than information that relates to the image control number and the picture frame number. The picture collection device 100 used in FIG. 1 is assumed to be an imaging device such as a camera that is capable of altering image quality. Hereinafter is explained the image processing for this type of the imaging device.

Figure 9:
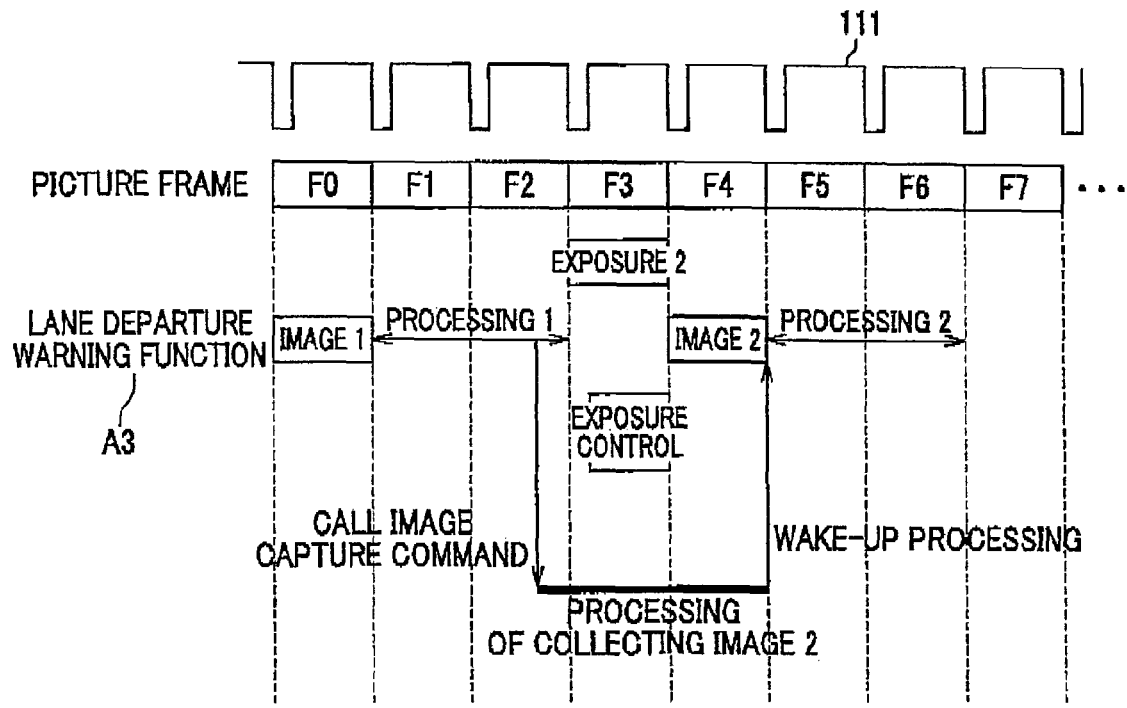
FIG. 9 is a time chart explaining the processing timing of the camera control.

As indicated in FIG. 9, there are cases where exposure control has to be performed before a picture is taken by adjusting gain and shutter speed of a camera according to moving speed of camera, background's brightness and brightness of an object to be detected in order to increase a discrimination rate in the image processing. If the camera control is performed on a picture frame of which an image is to be taken which is requested to be captured, it is complicated to manage a task to perform the camera control, taking the timing of taking the image into account. For instance, suppose that an image data 10 picture frames ahead of the present picture frame is to be ten with camera control parameters predetermined, the camera control processing has to be executed at the 9 th picture frame from the present one. Although it is possible to have the camera control processing like this executed by an individual image processing function, it is difficult to create a program to have the camera control processing like this executed by an individual image processing function.

Accordingly, the camera control is performed with the image capture command to which variables on camera control parameters are added in this embodiment. As a result, a programmer to create a program to perform each image processing function is able to easily create a program to perform the camera control by executing only one following command as indicated below.

$$\text{Capture Image(image control number, picture frame number, shutter speed, image angle)} \quad \text{(Formula 4)}$$

A shutter speed for an image to be taken, analog/digital transformer gain and a picture angle to determine a viewing field of the picture are assigned into this image capture command together with a picture frame number of an image data to be captured. As an picture frame number of an image to be captured is added on execution of the vertical synchronizing signal interruption processing as explained with FIG. 5B (S04), his picture frame number is checked in comparison with the captured picture frame information and camera control parameters needed for photographing in the following picture frame are set on a picture collecting device 100 as an imaging device.

Since Exposure 2 in FIG. 9 is executed 1 picture frame before the timing of collecting Image 2, camera parameters are set in accordance with the timing. This processing is possible because the photographing timing is known in advance with every input image given a unique picture frame number according to the input order.

There are many other camera parameters than the shutter speed, the gain and the image angle, such as white balance to adjust colors and a gamma correction coefficient. These parameters are controlled by executing only one command associated with the picture frame number of the needed image, which makes program development easier.

As already mentioned so far, the task management is made easier and the application are efficiently developed by adding necessary information to collect images of needed picture frames and perform each image processing function. By the way, the shutter speed and the gain adjustment are executed by making use of the vertical synchronizing signal interruption processing which is synchronized with the synchronizing signal of pictures. For instance, it is possible to execute camera control as soon as a picture frame number is added at a step of S04 in FIG. 5. Because the image processing functions send requests for camera control at various timings, a request for camera control from a task to which lower priority is set is cancelled if another request of camera control from a task to which higher priority is already set or comes out anew and the image processing function of this cancelled task waits for its turn of camera control.

There occurs a problem that a plurality of camera control parameters are set on an image data of a picture frame number when each image processing function tries to set camera control parameters it requests and assigns picture frame numbers of image data it tries to captures. How this problem is worked out is explained hereinafter.

According to the image capture requested picture frame information explained in FIG. 7, an identical camera control is assumed for all the captured images and it is sufficient to have tasks from image processing functions respectively associated with picture frame numbers of which images are requested to be captured. However if the camera control varies for a plurality of task of processing functions, it is necessary to check whether a collet image can be shared by a plurality of image processing functions with all the camera control parameters kept under control. To keep all the camera parameters under control Table 02 in FIG. 12 keeps the camera control parameters such as the shutter speed, the gain and the image angle associated with the image capture requested picture frame number. Then whether the collected image is shared by a plurality of image processing functions is checked as follows. If the camera control parameters for an image capture requested picture frame number is identical for a plurality of image processing functions, then it is determined that the collected image is shared. Moreover if the collected image is shared, task IDs of image processing functions which share an image data to be collected is registered in a task associated ID in Table 02 and the image data is supplied to each registered task according to the procedure already explained.

Next the case where the collected image can not be shared because of a difference in the camera control parameter is explained. When there is only one imaging device used, it is impossible to accept a plurality of camera control setting requests among which camera parameters are different from one another. In this case it is determined to which camera parameter setting priority is set after checking the rankings of the image processing functions that request image capture. The rankings of the camera parameter settings are set according to either a method of referring to the priority rankings of tasks of the image processing functions which are kept by an operation system or a method of select a camera control parameter setting based on the priority rankings determined and kept not by the operation system but by each image processing function. Whichever method is adopted, once a request is made by a task with higher priority, an already determined setting is cancelled and the camera control setting is made anew based on the request from the task with higher priority. This processing flow is explained with FIG. 13.

Figure 13:
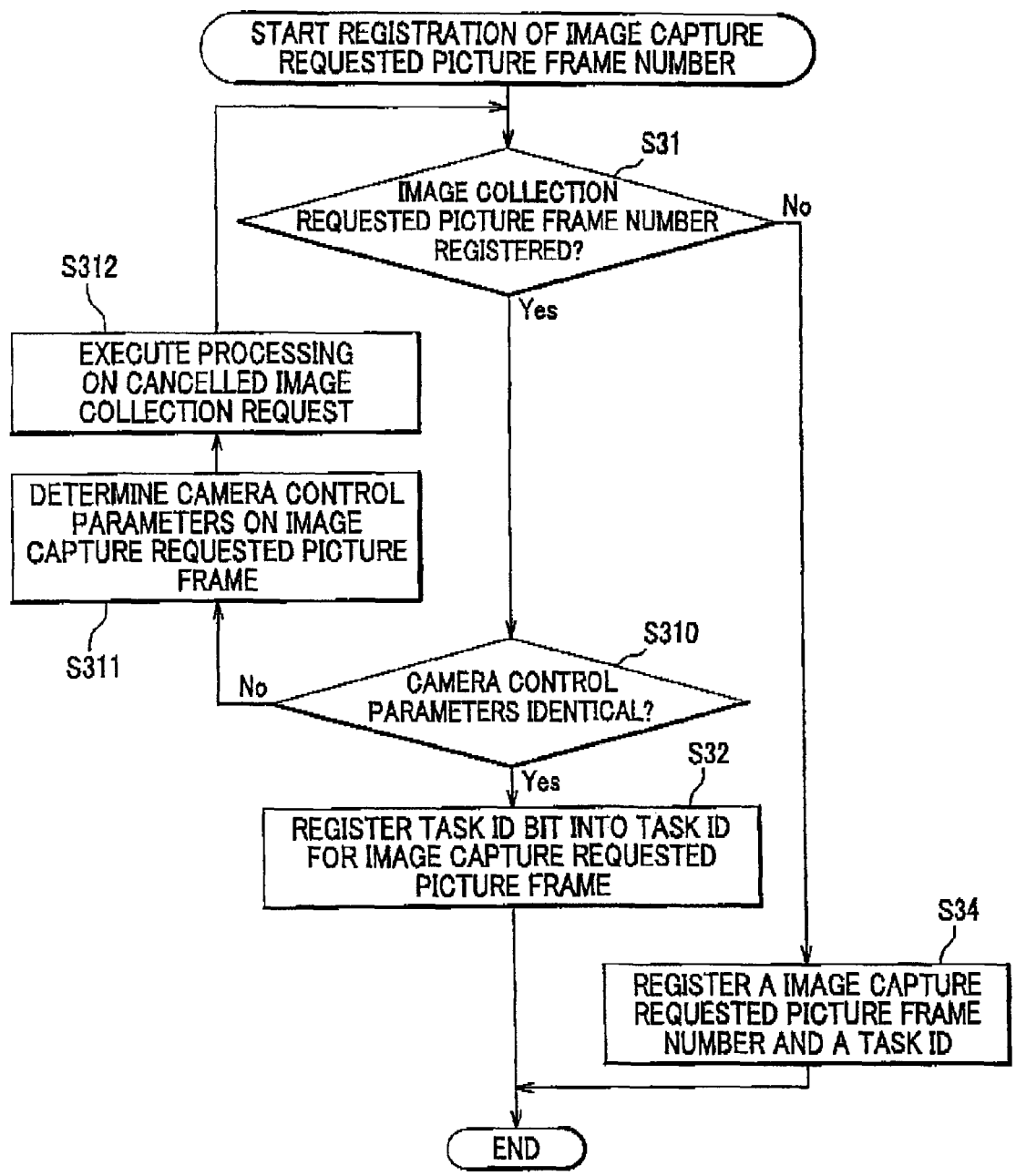
FIG. 13 is a flow chart explaining another example of registration processing of image capture picture frame numbers.

The processing flow in FIG. 13 is the same as that in FIG. 8 in principle. Once an image capture command is executed, checking is performed on whether an image capture request is made on the assigned image capture requested picture frame number (S31). If there is already the request made, checking is performed on whether the already determined camera control setting can be shared by the newly made image capture request (S310). A task number is added to an ID associated with a task on a frame number for which an image capture request has been made and of which an image data is to be shared (S32) and the processing ends. If the already determined camera control setting can not be shared, the camera control parameter setting is determined based on the checking performed on which request for capturing an image has priority to be executed (S311). As already explained, it is possible to determine the camera parameter setting by a method of referring to the priority rankings of asks of the image processing functions which are kept by an operation system or a method of selecting a camera control parameter setting based on the priority rankings. Next a request for capturing an image that is cancelled due to its lower priority ranking is dealt with according to the following 3 modes:

(1) Cancel the request for capturing an image and notify the task that made this request of the request having been cancelled. Then the image processing function of this task has to make another request for capturing an image.

(2) Assign a picture frame for a new image capture request, which comes before the picture frame for which the image capture request was cancelled.

(3) Assign a picture frame for a new image capture request, which comes after the picture frame for which the image capture request was cancelled.

In this embodiment any of these three methods is chosen and executed. If either the mode (2) or (3) is taken, an image capture requested picture frame number is determined anew (Step S312), the processing comes back to Step S31 and this newly determined image capture requested picture frame number is registered. According to the processing explained, the system determines an image to be captured. There is not only a method to determine the priority rankings on collecting an image based on the rankings kept by the operation system, but another method to determine the priority rankings on collecting an image based on the individual circumstance around a running vehicle. When the latter method is taken, images need to be captured at a predetermined interval under an emergency circumstance due to a risk of collision, which correlates with the velocity of the running vehicle. The above mentioned mode each task adopts and the priority rankings are made clear in the task management table in FIG. 2. In this task management table, each of which is associated with an image processing function are registered. Ahead of exerting each registered task are registered a task ID for the registered task, a mode to be adopted for a new image collection if an image capture request is cancelled, a validity flag indicating whether the registered task information is valid or invalid, a task's priority ranking and information on a requested image quality needed for an image processing to be executed by the registered task, an interval at which images are captured and the like.

Figure 14:
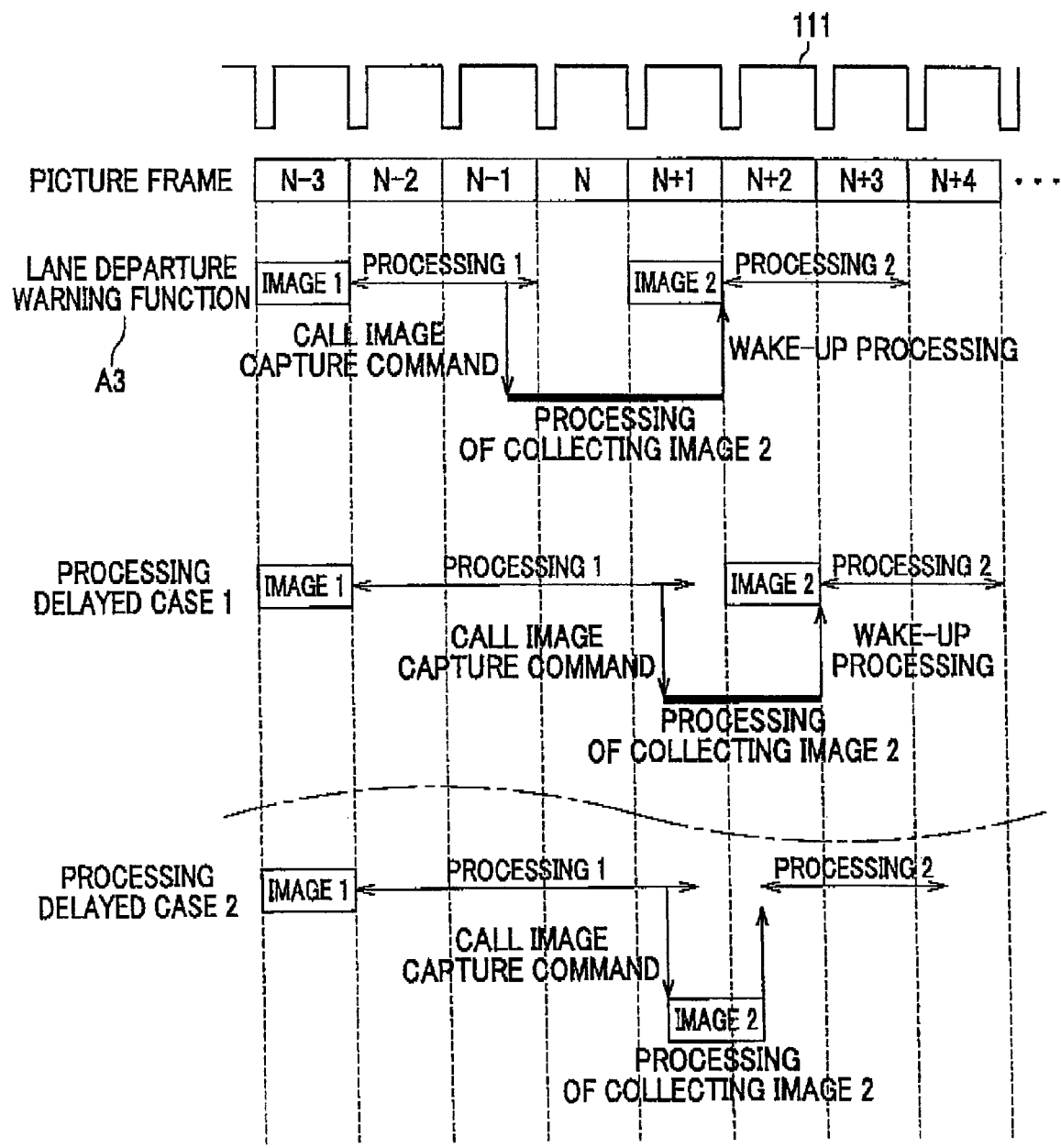
FIG. 14 is a time chart explaining the image capture and the image processing.
Figure 15:
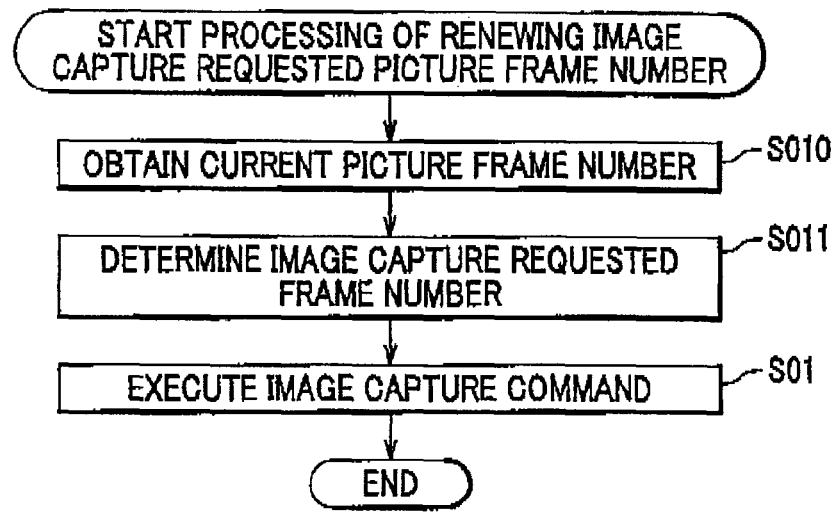
FIG. 15 is a flow chart explaining the processing of executing image capture command.

According to the embodiment so far explained each processing is finished within a predetermined period without delay as explained in FIG. 4. However the processing time varies depending on the content of a captured image data and other processing than an image processing. If the processing time becomes shorter and there is no change in the image capture requested picture frame, the processing tips as indicated in FIG. 4 apply. For instance, suppose that Processing 1 is completed for a shorter time, that the timing to start a processing for Image 2 to be collected comes in the N−2 picture frame and that the picture frame number for Image 2 to be requested to be captured is N+1, the processing waits for the N+1 picture to come and there is no change in the timing to start Processing 2. The processing to be executed if Processing 1 is delayed on the other hand is explained with FIG. 14 and FIG. 15. If the Processing 1 is delayed by so long a time that a image capture command to capture Image 2 can not be executed by the time of the N+1 picture frame at which Image 2 is scheduled to be captured, the image processing function performs an image capture picture frame number renewal processing as shown in the flowchart in FIG. 15 in order to determine anew a picture frame number of a picture frame at which Image 2 is to be captured. In the image capture picture frame number renewal processing, to begin with, the current picture frame number is obtained to check when an image capture processing is possible (S010). Based on the obtained information on the current picture frame number, a delayed treatment is executed and a new image capture frame number is determined (S011). Then according to the determined picture frame number the image capture command is executed. (S01).

There are two possible delayed treatments to be executed when determining this picture frame number. In the delayed treatment case 1, the image capture requested picture frame number is changed from N+1 to N+2 due to the processing's delay. In this case the processing can be prevented from coming into a setback by simply shifting the timing of the image capture processing. In the delayed treatment case 2, the image capture request on the picture frame N+1 is executed as scheduled. In order to do this, the image data already collected are stored in the storage device 40 together with the picture frame number. With a storage capacity kept in the storage device 40 for image data of K picture frames, it is possible to distribute to a task an image data which is requested by the task and of any picture frame before the picture frame K picture frames ahead before which all image data of the K picture frames can be stored. Accordingly in the case of this delayed treatment 2, collection of image data is under way while an image capture command for the image data is being executed before it is completed. Therefore as soon as collecting the image data of the requested picture frame into the storage device 40 is finished, the task, which requests the image data, is able to receive the image data and start a following image processing.

In this embodiment, if any processing of an image processing function delays, the timing of capturing an image data can be changed without referring to other processing. When an image capture command is executed for an image processing function that needs camera control, the checking processing of sharing an image data is executed as explained in FIG. 13. If the priority ranking of the task that requests an image data is low or the camera control is not finished in time, the collected image data can not be shared, which could have an influence on a task other than the task whose processing interval is extended. However a processing of an image processing function whose priority ranking is high is executed preferentially on image receiving without a setback.

The embodiment is explained so far with only one imaging device. However if a plurality of imaging devices are involved, a picture frame number of which an image data is to be received is assigned in a similar method to that already explained. In other words when receiving an image data is requested, an imaging device is assigned.

Utilizing the present invention, it is easier to combine a number of image processing functions and add and delete an individual image processing function. According to the conventional technology any of a task of picture interruption and scheduling processing involves a compiling or a link processing on the whole system. Therefore when the system is installed in a vehicle, it is impossible to is a new image processing function that can be downloaded from the network and upgrade the system. However if the present invention is used, an interruption processing and a scheduling management can be controlled independently of each image processing function. As a result, each task is configured as one independently executed and it is possible to download a task from the network and upgrade an individual task.

In the case above mentioned, an image processing device having an interface, which is shown in FIG. 10, is possibly used. With this interface a user can select freely any function. The management of this user interface is performed with the user interface function P3 indicated in FIG. 16. The user interface function P3 executes a display processing of the selected screen image on the image processing functions as indicated in FIG. 10, based on the information on the task management table in FIG. 2. When an image processing function is selected on this screen image by a user, this information is sent to the user interface function P3. The user interface function P3 transmits the information on the selected image processing function to the image processing management function P2. The image processing management function P2 starts up a image processing task (for instance lane departure warning function) that is requested to start up, execute the image processing and set the validity flag in the task management table to "ON".

In this processing, the image processing task to start up can be execute independently of other asks that have been working. As explained, it is possible to freely select image processing functions with the present invention because a combination of tasks can be changed easily. Moreover since each image processing function works independently, an execution module is possible made a different file if an interface of each image processing function is defined, which makes dynamic loading possible. In other words, the processing and the task configuration which are explained in FIG. 5, FIG. 6 and FIG. 16 are possibly realized on different execution files and the image processing functions A1 to A4 are made different files. The processing like this can be done with various installing methods in the information control program to divide an execution file.

Figures 11, 12:
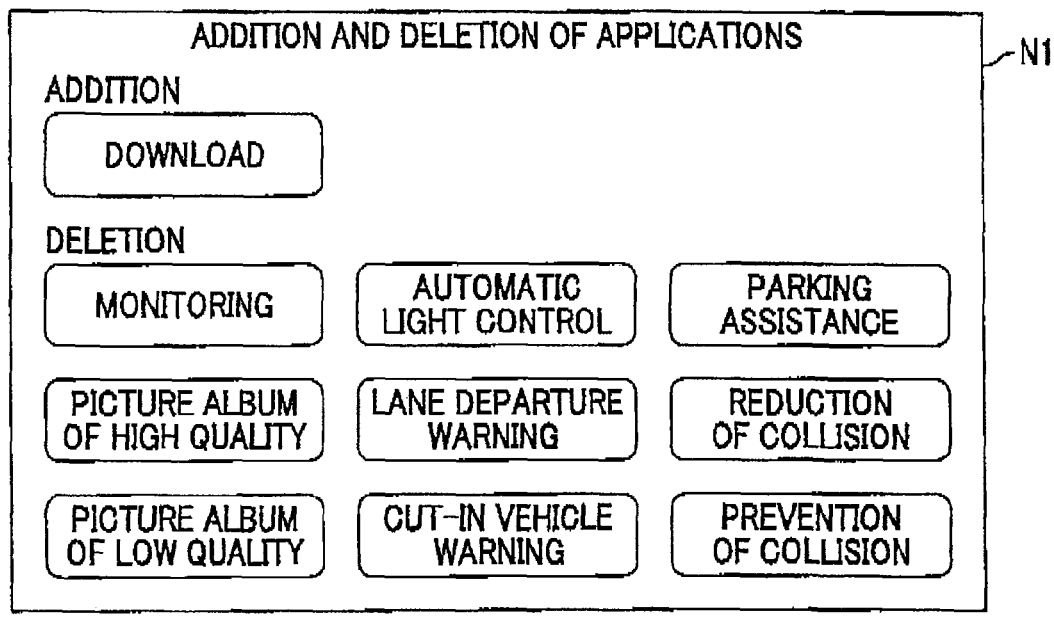
FIG. 11 is a figure schematically explaining a user interface in which tasks are registered.
FIG. 12 is a figure explaining another example of a table of image capture picture frame information.

According to the present invention, each functional program is not influenced by increase and decrease in functions and compiling is not necessary. As a result, each function is divided into individual execution files. Making an access to the network through the communication means, a necessary function from among files to each of which an image processing function is installed is downloaded and registered in the task management table, as is indicated in FIG. 11. According to the present invention, it is possible to execute the selected image processing functions among the registered image processing functions as indicated in FIG. 10 and the image processing functions to be executed are freely selected by a user. Since each image processing function can be controlled without interfering with others, it is possible download a new image processing function through the network and delete a registered image processing function.

The invention claimed is:

1. An image processing device, performing an image processing with a plurality of tasks sharing at least one picture collection device that continually collects image data, the image processing device comprising:

a picture frame assigning unit that assigns a frame number to the image data to be collected by the picture collection device;

an image capture requested picture frame receiving unit that receives from each of the plurality of the tasks and a frame number condition associated with an image capture request, the frame number condition directly or indirectly designating the frame number of the image data the task requests;

an image capture requested picture frame determining unit that determines whether each of the frame numbers assigned by the picture frame assigning unit to the image data collected by the picture collection device corresponds to the frame number condition designated by any of the plurality of the tasks;

a requested picture frame image collection notification unit that notifies the any of the plurality of the tasks that the image data the any of the plurality of the tasks requests has been collected and performs an interruption processing to make the any of the plurality of the tasks in a state of being executed, if the each of the frame numbers assigned by the picture frame assigning unit to the image data collected by the picture collection device corresponds to the frame number condition designated by the any of the plurality of the tasks;

wherein the frame number condition is the frame number for the image data or the formula designating the frame number for the image data wherein the image capture request that the image capture requested picture frame receiving unit receives from the task includes camera control parameters to control the picture collection device that collects the image data requested by the task as well as information to identify the image data; and wherein a picture for the image data is taken by the picture collection device after the camera control parameters are set on the picture collection device, wherein if the frame number for the picture to be taken corresponds to the frame number condition designated by any of a plurality of the tasks, the camera control parameters for the picture to be taken are read from the image capture request associated with the frame number condition designated by the any of a plurality of the tasks and set on the picture collection device before the picture is taken.

2. An image processing device according to claim 1, wherein the camera control parameters include at least one of a shutter speed, an analog/digital transformation gain and an image angle and determine an image quality.

3. An image processing device according to claim 1, further comprising:

a storage device that keeps image data identification information to identify the image data the task requests and task identification information, both the image data identification information and the task identification information are associated with each other; and wherein if the image data identification information is identical with an identification number assigned by the picture frame assigning unit, a task scheduling for the image processing is executed by transmitting an interruption signal for the task whose identification information is identical with identification information of the task kept in the storage device.

4. An image processing device according to claim 2, further comprising:

a storage device that keeps image data identification information to identify the image data which the task requests and task identification information, both the image data identification information and the task identification information are associated with each other; and wherein it is checked based on the camera control parameters whether or not the image data for a picture frame to be collected that one of the tasks requests is shared by another of the tasks that requests the image data for the same picture frame.

* * * * *